INVENTOR.
BERNARD KATZ
BY Peter L. Tailer
ATTORNEY

United States Patent Office 3,541,753
Patented Nov. 24, 1970

3,541,753
BOTTLE PACKAGING PROCESS
Bernard Katz, Greenwich, Conn. (% Empsco Inc., Town Dock Road, New Rochelle, N.Y. 10805)
Filed Dec. 12, 1968, Ser. No. 783,271
Int. Cl. B65b 21/06
U.S. Cl. 53—26       4 Claims

ABSTRACT OF THE DISCLOSURE

Empty bottles are arrayed and sealed in light plastic film which is heat shrunk about the bottles. The light plastic film is punctured about the bottle necks, the bottles are filled and capped, and the filled array of bottles still in the light plastic film is sealed within a heavier plastic film which is heat shrunk about the array of bottles as final packaging.

BACKGROUND OF THE INVENTION

Light plastic bottles for milk or other comestibles are often transported from their place of manufacture to a bottling plant where they are filled and packaged in fiberboard or other containers for shipping to stores, eating facilities, or the like. This conventional treatment requires that the empty bottles be packaged for transportation, removed from these packages, sterilized, filled, capped, and repackaged for shipment to consumers. This process is costly and requires labor at several stages.

SUMMARY OF THE INVENTION

The process of this invention eliminates several steps in the process of delivering bottles of comestibles to consumers. As sterilized, newly molded bottles leave a molding machine, they are arrayed and sealed in a first light plastic film which is heat shunk about the array of empty bottles. In this manner, the array of empty bottles is kept germ free until delivery to a bottling location where the array of bottles is left packaged in the first plastic film which is punctured about the necks of the bottles. The array is then filled and capped as a unit and heat sealed in a heavier plastic film as ultimate packaging for shipping to consumers.

The process of this invention eliminates the need to provide separate packaging in costly fiberboard containers for both the empty and the filled bottles. Often manual labor is required to load and unload such containers. Further, because of the heat of molding sterilizes bottles, they are sterile on issuing from the molding machine. This sterile condition is maintained by the first light heat shrunk film until their delivery to the bottling location. This renders unnecessary the conventional sterilization step. Since the bottles are handled in the same unbroken array from the bottle mold to the consumer, the arrays may be handled with much less manual labor or by more easily designed automatic machinery.

Since both the punctured light film and the heavy final film are heat shrunk about the array of filled bottles, the final packaging is particularly strong.

Many other advantages result from the process of this invention as will be understood from the following description and accompanying drawing.

DESCRIPTION OF THE PREFERRED EMBODIMENT

Figure 1:
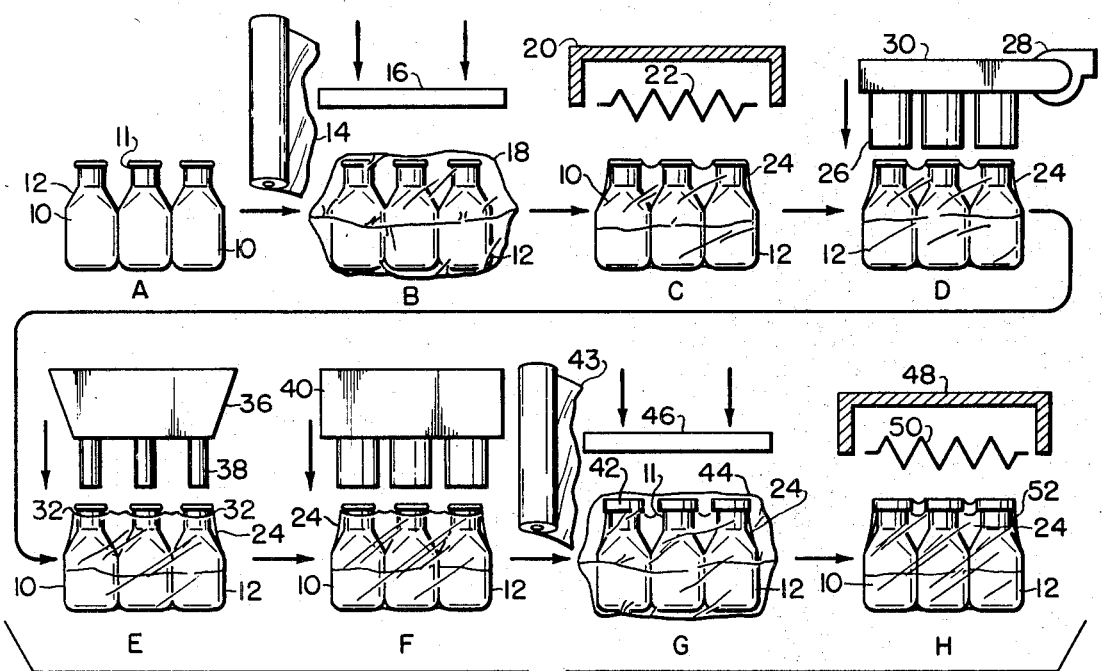
FIG. 1 is a flow diagram illustrating the steps in the process of this invention.

Referring to the drawing in detail, FIG. 1 shows the first step A of the process of this invention. In step A, bottles 10, having the narrower necks 11, are arranged in an array 12 as they issue from a molding machine (not shown). Such bottles 10 are conventionally molded from plastic such as polyethylene, but the process of this invention may be used with any containers having necks. The bottles 10 are sterile as they issue from the molding machine.

In step B, the array 12 of sterile bottles 10 is wrapped in any suitable thermoplastic film 14 which is heat sealed by sealing head 16 to form a loose film package 18. In step C the loose package 18 is heat shrunk in a shrink tunnel 20 or the like containing a heating element 22 so that a snug film package 24 results about the array 12. The empty bottles 10 in package 24 will remain sterile as they are stored and/or shipped to a bottling location for filling with comestibles.

Figures 2, 3:
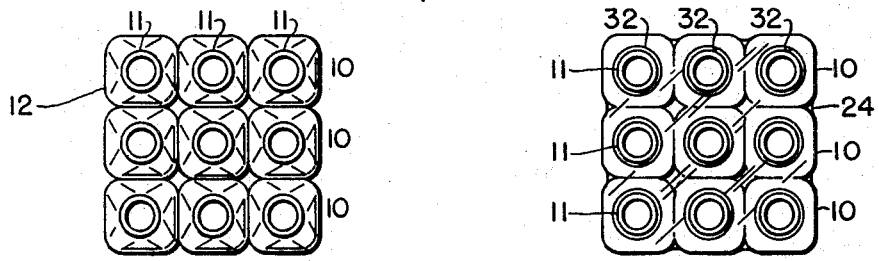
FIG. 2 is a top view of an array of unpackaged, newly molded bottles.
FIG. 3 is a top view of an array of bottles packaged in a heat shrunk first light plastic film which has been punctured to allow for the filling of the bottles.
Figure 4:
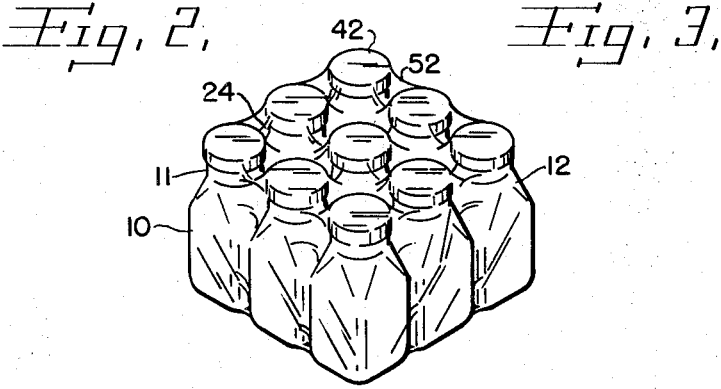
FIG. 4 is a perspective view of an array of bottles filled, capped, and finally packaged according to this invention.

The package 24 is light and easily handled manually or by automatic machinery. With automatic plastic film heat sealing machines, no hand labor is required to form the packages 24 of empty bottles 10. While an array 12 of bottles 10 is shown in FIGS. 1 and 2 in a three by three configuration, any desired array may be used in the process. Since the bottles 10 are very light when empty, a thin film 14 may be used to form package 18 which will require only a small amount of heat to shrink it to form package 24.

Referring further to FIG. 1, the package 24 in step D is prepared for the filling of bottles 10 by the puncturing of package 24 about the necks 11 of each bottle. This is accomplished by gang mounted and sharpened tubular punches 26 connected to a suction pump 28. Pump 28 sucks the cut out plugs of film from package 24 through the tubular punches 26 and the gang mounting 30. The punctured package 24 is shown in FIG. 3 with an aperture 32 in package 24 about the neck 11 of each bottle 10.

As shown in step E, the punctured package 24 passes under a filling head 36 having filling tubes 38 which enter and fill each bottle 10 with a comestible. In step F, the array 12 of filled bottles 10 in package 24 pass under a capping head 40 which places caps 42 or other closures over or in the necks 11 of the bottles 10. In Step G, the capped and filled bottles 10 are wrapped in any suitable thermoplastic film 43 which is sealed in a loose package 44 by a sealing head 46. The final step H of the process of this invention passes the array 12 through shrink tunnel 48 containing heating element 50 to form the package 52. Shrink tunnel 48 shrinks both the punctured inner package 24 and outer film 43 to form the final package 52.

The comestible within the bottles 10 allows a higher heat to be used in shrink tunnel 48 without danger of the film 42 or 14 bonding to the plastic bottles 10 as the comestible prevents shrink tunnel 48 from heating the bottles 10 sufficiently to cause such bonding. This higher heat enables a thicker film 43 to be used in package 52. The thicker film 43 is required to secure the heavier filled bottles 10. The thin film 14 of the punctured package 24 shrinks downward about the bottle necks 11 and forms an inner layer of package 52.

While the process of this invention has been shown and described in the best manner known, this is purely exemplary and changes may be made without departing from the spirit and scope of the invention except as it may be more limited in the appended claims wherein.

I claim:
1. In the process of forming a package of an array of capped and filled containers having upward facing openings, the steps of:
   (a) arranging containers in an array,
   (b) sealing a first film loosely about the array,
   (c) heat shrinking the first film about the array to form a package of empty containers,
   (d) cutting apertures in the first film forming the package of empty containers over the openings of said containers, the apertures being at least as large as the openings in said containers,
   (e) filling the array of packaged containers through the apertures cut in the first film forming the package,
   (f) capping the filled array of containers,
   (g) sealing a second film loosely about the filled and capped array of containers, and
   (h) heat shrinking the second film about the first film and about the filled and capped array of containers forming a package of the filled and capped containers.

2. The process according to claim 1 wherein said containers are bottles having necks and wherein in step (d) the apertures cut in the first film forming the package of empty bottles are cut larger than the necks of the bottles.

3. The process according to claim 1 wherein the second film in step (g) is thicker than the first film in step (b).

4. The process according to claim 1 wherein in step (d) the apertures cut in the film forming the package of empty containers are cut by tubular punches connected to a vacuum source to draw up cut out plugs of the film.

References Cited
UNITED STATES PATENTS

| | | | |
|---|---|---|---|
| 3,353,326 | 11/1967 | Becker | 53—30 X |
| 3,416,653 | 12/1968 | Farquhar | 53—30 X |
| 3,425,542 | 2/1969 | Bolen. | |

THERON E. CONDON, Primary Examiner

E. F. DESMOND, Assistant Examiner

U.S. Cl. X.R.

53—27, 30